US005195243A

United States Patent [19]

Junod

[11] Patent Number: 5,195,243

[45] Date of Patent: Mar. 23, 1993

[54] METHOD OF MAKING A COATED POROUS METAL PANEL

[75] Inventor: Larry A. Junod, Clayton, Ind.

[73] Assignee: General Motors Corporation, Detroit, Mich.

[21] Appl. No.: 843,033

[22] Filed: Feb. 28, 1992

[51] Int. Cl.[5] .......... B23P 11/02

[52] U.S. Cl. .......... 29/897.32; 29/460; 427/282

[58] Field of Search .......... 29/897.32, 455.1, 460, 29/525.1, 527.2, 527.4; 427/282; 118/504, 505

[56] References Cited

U.S. PATENT DOCUMENTS 4,323,593 4/1982 Tsunashima .......... 427/282
4,422,082 12/1983 Louzil .......... 29/527.4
4,426,762 1/1984 Schnedecker .......... 29/527.4
4,803,110 2/1989 Ahn et al. .......... 427/282
5,111,579 5/1992 Anderson .......... 29/897.32

*Primary Examiner*—Irene Cuda
*Attorney, Agent, or Firm*—Saul Schwartz

[57] ABSTRACT

A coated porous metal panel includes a first outer surface on one side of the panel, a second outer surface on the other side of the panel, a plurality of laterally offset discharge and inlet pores in respective ones of the first and the second outer surfaces, an internal chamber in the panel communicating with each of the inlet and discharge pores so that tortuous gas flow paths are defined through the porous metal panel, and a shield lamina mechanically clamped against the second outer surface. The shield lamina has shield pores aligned with the inlet pores to permit gas flow into the inlet pores. A plurality of extraction passages are formed in the panel between the internal chamber and the second outer surface and directly behind each of the discharge pores. When the coating material is sprayed on the first outer surface with the shield lamina not attached to the panel, surplus coating entering the discharge pores passes through the extraction passages for collection behind the panel. The shield lamina blocks the extraction passages to prevent gas flow into the extraction passages and short circuiting of the tortuous gas flow paths in the porous metal panel.

2 Claims, 1 Drawing Sheet

METHOD OF MAKING A COATED POROUS METAL PANEL

FIELD OF THE INVENTION

This invention relates to coated porous metal panels and to methods of making the same.

BACKGROUND OF THE INVENTION

Porous metal panels are described in U.S. Pat. Nos. 3,584,972 and 4,004,056, each assigned to the assignee of this invention. U.S. Pat. No. 4,338,360 and U.S. Pat. No. 4,103,163, each assigned to the assignee of this invention, describe methods of applying a thermal barrier coating on porous metal panels with a minimum deposit of coating material in the pores of the panel. A coated porous metal panel and method of making the same according to this invention are novel alternatives to the panels and methods described in the aforesaid United States patents and patent application.

SUMMARY OF THE INVENTION

This invention is a new and improved coated porous metal panel including a first outer surface having a pattern of discharge pores therein, a second outer surface having a pattern of inlet pores therein laterally offset from the discharge pores and connected to the discharge pores through an internal chamber of the panel, and a shield lamina mechanically clamped against the second outer surface. The shield lamina has a plurality of shield holes arrayed in the same pattern as the inlet pores so that when the shield lamina is in place, the inlet pores are exposed to a source of coolant gas. The panel further includes a plurality of extraction passages behind respective ones of the discharge pores and opening through the second outer surface. When the shield lamina is in place, the extraction passages are blocked to foreclose entry of coolant gas into the extraction passages.

In the method according to this invention, coating material is sprayed generally perpendicular to the first outer surface with the shield lamina not in place. Most of the coating material deposits on the first outer surface to form a coating thereon. Surplus coating material entering the discharge pores passes completely through the panel by way of the extraction passages and is collected behind the second outer surface. After the coating is applied, the shield lamina is mechanically clamped against the second outer surface to block the extraction passages. In alternate embodiments, mechanical blockers, such as pins or the like, may be inserted in the extraction passages from the second outer surface to project into the discharge pores and thereby physically block entry of coating material into the discharge pores, the blockers being removed after the coating is applied and the extraction passages being closed by the shield lamina as described above.

DESCRIPTION OF A PREFERRED EMBODIMENT

Figure 1:
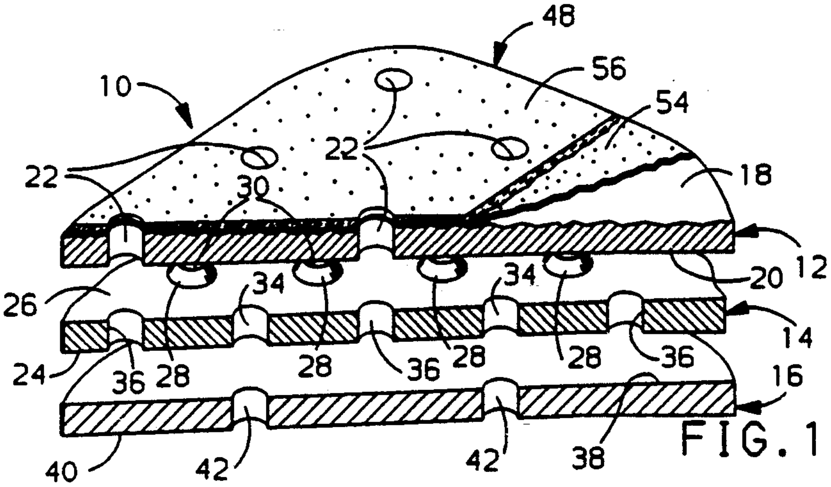
FIG. 1 is a fragmentary, partially broken-away, exploded perspective view of a coated porous metal panel according to this invention.
Figure 2:
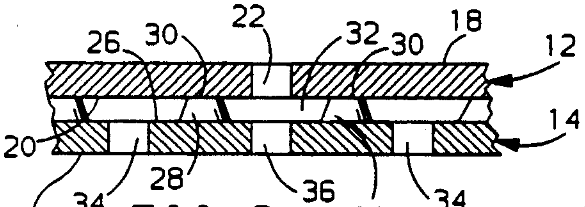
FIG. 2 is an elevational view in cross section of a portion of the coated porous metal panel according to this invention.

Referring to the drawings, a coated porous metal panel (10) according to this invention is illustrated as a laminated structure. It is understood that the panel could be fabricated by alternate methods including casting. The laminated panel (10) includes a first lamina (12), a second lamina (14), and a shield lamina (16). The first lamina has an outer surface (18) defining a first outer surface of the panel (10) and adapted for exposure to a high temperature heat source, not shown, an inner surface (20), and a plurality of discharge pores (22) arrayed in a regular first grid or pattern.

The second lamina (14) has an outer surface (24) defining a second outer surface of the the panel (10) and adapted for exposure to a source of coolant gas under pressure, not shown. The side of the second lamina opposite the outer surface (24) is etched or chemically machined to define an inner surface (26) interrupted by a plurality of integral, raised pedestals (28) each having a flat bonding surface (30) thereon. The second lamina (14) is diffusion bonded to the first lamina (12) at the abutting interfaces between the inner surface (20) and the boding surfaces (30) on the pedestals (28). The inner surfaces (20),(26) of the first and second laminas are spaced apart by the pedestals (28) and define therebetween an internal chamber (32) of the porous metal panel.

The second lamina (14) has a plurality of inlet pores (34) therethrough arrayed in a regular second grid or pattern which is laterally offset relative to the first pattern of the discharge pores (22). Accordingly, each of the inlet pores (34) is laterally offset relative to each of the discharge pores (22) so that gas flow from the inlet pores to the discharge pores is constrained to follow tortuous flow paths through the internal chamber (32). The second lamina (14) further includes a plurality of extraction passages (36) therethrough arrayed in the first pattern so that each of the discharge pores (22) has directly behind it one of the extraction passages (36).

The shield lamina (16) has an inner surface (38) facing the outer surface (24) of the second lamina and an outer surface (40) facing the aforesaid source of coolant gas under pressure. The shield lamina has a plurality of shield pores (42) therethrough arrayed in the second pattern. The shield pores (42) are at least as large as the inlet pores and preferably slightly larger.

Figure 4:
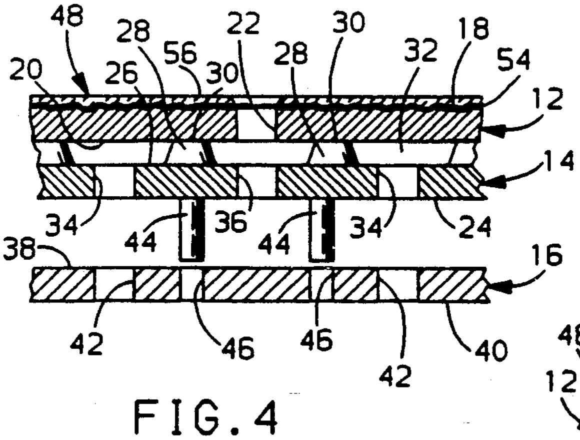
FIG. 4 is similar to FIG. 3 and illustrates another step in the method according to this invention.
Figure 5:
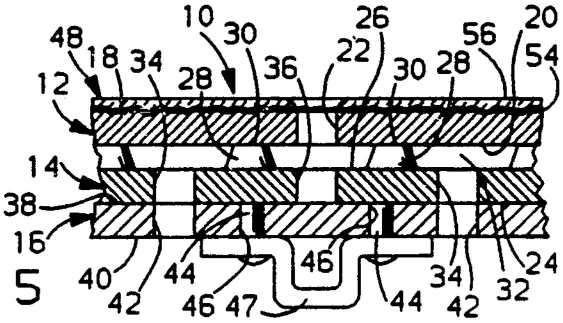
FIG. 5 is similar to FIGS. 2–4 and shows the coated porous metal panel according to this invention.

A plurality of cylindrical rivet bodies (44), FIGS. 4–5, are welded or otherwise rigidly attached to the second lamina (14) perpendicular to the outer surface (24) thereof. The rivet bodies (44) are received in a corresponding plurality of clearance holes (46) in the shield lamina (16) when the inner surface (38) of the shield lamina is juxtaposed the outer surface (24) of the second lamina. A mounting bracket (47) may conveniently be fitted over the rivet bodies (44) against the outer surface of the shield lamina for mounting the porous metal panel (10) on a support structure, not shown. The rivet bodies are headed over behind the bracket to mechanically rigidly unite the shield lamina, the bracket (47), and the first and second laminas (12),(14).

The shield pores (42) overlay the inlet pores (34) for maintaining exposure of the inlet pores to the source of coolant gas under pressure. The remaining, solid portion of the shield lamina blocks the extraction passages to prevent entry of coolant gas into the extraction passages though the outer surface (24) of the second lamina With the shield lamina in place, coolant gas under pressure enters the inlet pores (34) through the shield pores (42), circulates in tortuous paths through the internal chamber (32) for convection cooling the panel, and exits through the discharge pores (22) to form a protective film between 5 the panel and the heat source.

Figure 3:
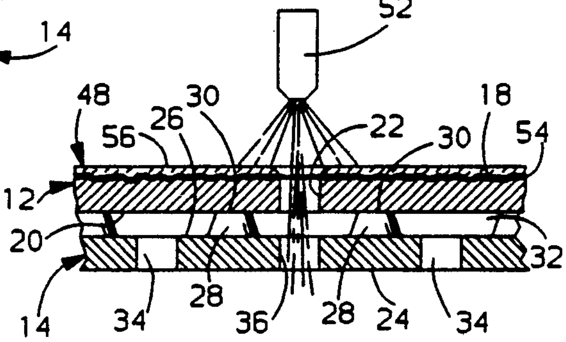
FIG. 3 is similar to FIG. 2 and illustrates one step in the method according to this invention.

As seen best in FIGS. 3–5, a thermally resistant coating (48) is applied to the porous metal panel (10) by a method according to this invention including the steps of mechanical surface preparation and spray coating. The aforesaid steps are performed with the shield lamina (16) not attached and may include grit blasting the outer surface (18) of the first lamina and spray application from a spray apparatus (52). The coating (48) may include a bond coat (54) such as NiCrAlY on the grit blasted outer surface (18) and a top coat (56) such as Yttria-stabilized zirconia over the bond coat.

The apparatus (52) sprays the bond coat and top coat material generally perpendicular to the outer surface (18). Necessarily, a surplus fraction of the coating material sprayed toward the outer surface (18) enters the discharge pores (22). The extraction passages (36), being directly behind the discharge pores, define through passages which conduct the surplus coating material directly through the second lamina for collection behind the latter. The presence of the extraction passages behind the discharge pores effectively short circuits the internal chamber (32) and the inlet pores (34) to minimize deposit of surplus coating material in the internal chamber (32) and in the discharge and inlet pores (22),(34).

In succeeding steps of the method according to this invention, the shield lamina (16) and bracket (47) are assembled over the rivet bodies (44) and clamped against the second lamina (14) as described above. Other fastening techniques, such as threaded studs welded to the second lamina, are contemplated.

It is understood that the extraction passages (36) permit use of other techniques for precluding deposit of surplus coating material in the internal chamber (32) and in the discharge and inlet pores (22),(34). For example, mechanical blockers such as pins, not shown, may be inserted into the extraction passages (36) from behind the second lamina. The pins may extend to just beyond or outboard of the outer surface (18) to completely preclude entry of surplus coating material into the discharge pores. Then, at the conclusion of the spray operations, the pins are withdrawn to expose the discharge pores and the shield lamina is attached as described above. Alternatively, maskant, not shown, may be introduced into the extraction passages to fill the discharge pores from behind. The maskant precludes entry of surplus coating material into the discharge pores and may be chemically or thermally removed following coating.

The embodiments of the invention in which an exclusive property or privilege is claimed are defined as follows:

1. A method of making a coated porous metal panel comprising the steps of:

forming a metal panel having a first outer surface on one side of said panel and a second outer surface on the other side of said panel, forming a plurality of discharge pores in said first outer surface of said panel arrayed in a first pattern, forming a plurality of inlet pores in said second outer surface of said panel arrayed in a second pattern laterally offset from said first pattern so that each of said discharge pores is laterally offset from each of said inlet pores, forming an internal chamber in said panel communicating with each of said inlet pores and said discharge pores, forming a plurality of extraction passages in said panel extending between said internal chamber and said second outer surface and arrayed in said first pattern so that each of said extraction passages is disposed behind a corresponding one of said discharge pores, spraying a coating material substantially perpendicular to said first outer surface to form a coating on said first outer surface, capturing surplus coating material entering each of said discharge pores behind said second outer surface of said panel by conducting said surplus coating material through corresponding ones of said extraction passages whereby deposit of said surplus coating material in said internal chamber and in said inlet and said discharge pores is minimized, forming a shield lamina having a plurality of shield pores therein at least as large as said inlet pores and arrayed in said second pattern, and mechanically attaching said shield lamina to said panel in juxtaposition to said second outer surface thereof with each of said shield pores in register with a corresponding one of said inlet pores so that said inlet pores are open through said shield pores and said extraction passages are blocked by said shield lamina.

2. The method recited in claim 1 wherein the step of mechanically attaching said shield lamina to said panel includes the steps of:

attaching a plurality of posts to said panel perpendicular to said second outer surface thereof, forming a corresponding plurality of attaching holes in said shield lamina for receiving respective ones of said posts, and forming clamping means on said posts outboard of said shield lamina whereby said shield lamina is clamped against said second outer surface of said panel.

* * * * *